United States Patent [19]

Zeeb

[11] Patent Number: 5,676,189
[45] Date of Patent: Oct. 14, 1997

[54] MOTORIZED DRAPERY TRACK ASSEMBLY

[75] Inventor: Richard Zeeb, Flint, Mich.

[73] Assignee: Arbor Marketing Limited, Flint, Mich.

[21] Appl. No.: 291,201

[22] Filed: Aug. 16, 1994

[51] Int. Cl.$^6$ ............................................. A47H 1/00
[52] U.S. Cl. ........................... 160/331; 105/30; 105/33; 105/153; 104/295; 248/265; 248/291.1
[58] Field of Search ..................... 105/30, 32, 33, 105/153; 204/295, 88.1, 93; 248/251, 257, 256, 265, 270, 231.8, 288.1, 288.3, 291.1; 160/331

[56] References Cited

U.S. PATENT DOCUMENTS

| | | | |
|---|---|---|---|
| 3,091,286 | 5/1963 | Madsen | 160/331 |
| 3,136,358 | 6/1964 | Madsen | 160/331 |
| 3,331,428 | 7/1967 | Ford | 160/331 |
| 3,563,179 | 2/1971 | Gorjanc | 105/30 X |
| 3,568,605 | 3/1971 | Pettit | 105/30 X |
| 3,620,284 | 11/1971 | Shayman | 160/331 |
| 3,861,738 | 1/1975 | Whitney | 296/138 |
| 4,819,708 | 4/1989 | Onosato et al. | 160/331 |
| 4,926,922 | 5/1990 | Shimazaki | 160/331 |
| 5,069,141 | 12/1991 | Ohara et al. | 105/30 |
| 5,419,260 | 5/1995 | Hamilton | 105/30 X |

*Primary Examiner*—Blair Johnson
*Attorney, Agent, or Firm*—Howard & Howard

[57] ABSTRACT

The present invention is a motorized drapery track assembly specially adapted for use in traversing very sharp corners without derailment. The system employs a motorized carrier that is mounted upon a track and a plurality of trolleys to which a drapery is mounted. The carrier is interconnected to at least one trolley and pulls or pushes the drapery along the track. The carrier includes at least one guide wheel and a drive wheel, which are relatively moveable with respect to each other to allow for movement at sharp corners to prevent derailment of the carrier. The track itself is specifically adapted so that it can be easily bent and installed. Special brackets are employed so that the track can be installed in areas with restricted space.

20 Claims, 3 Drawing Sheets

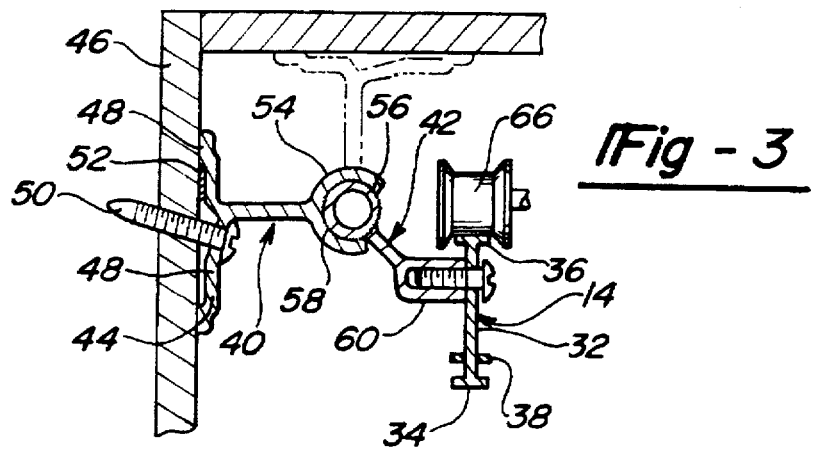
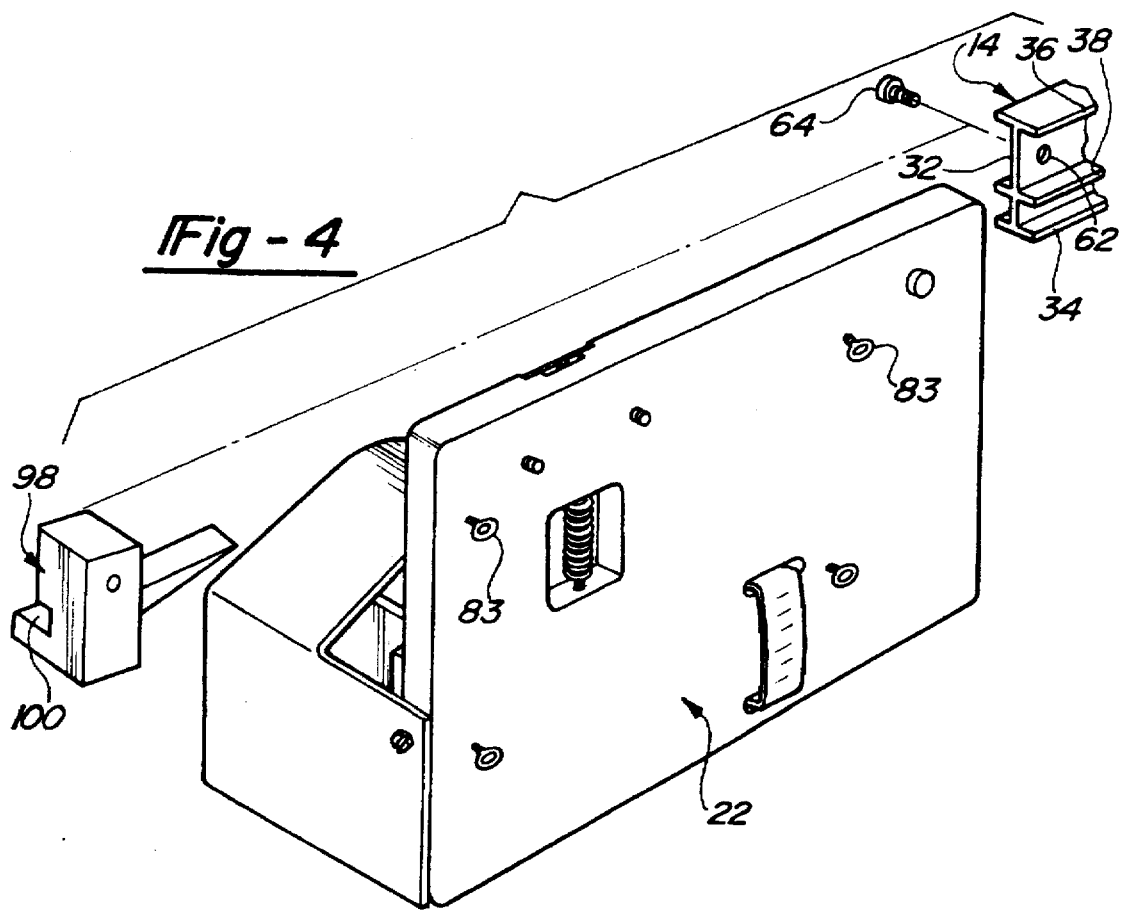

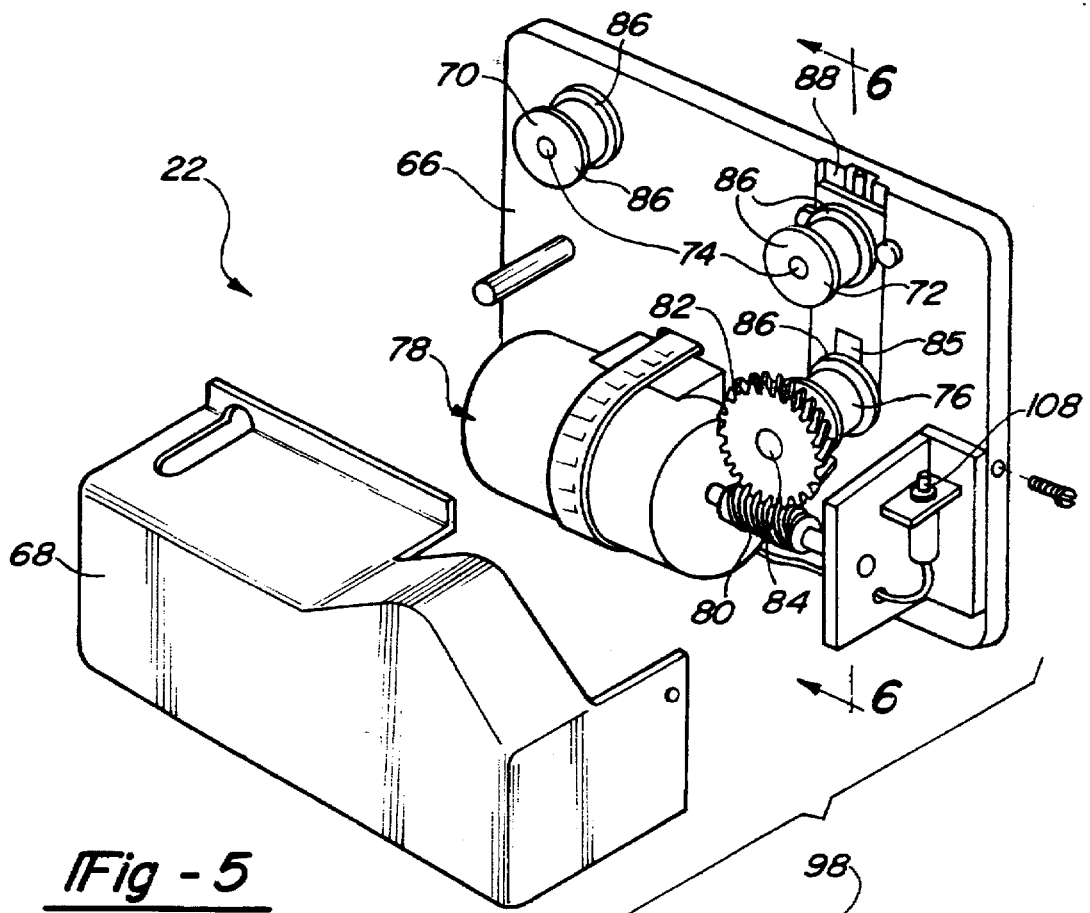
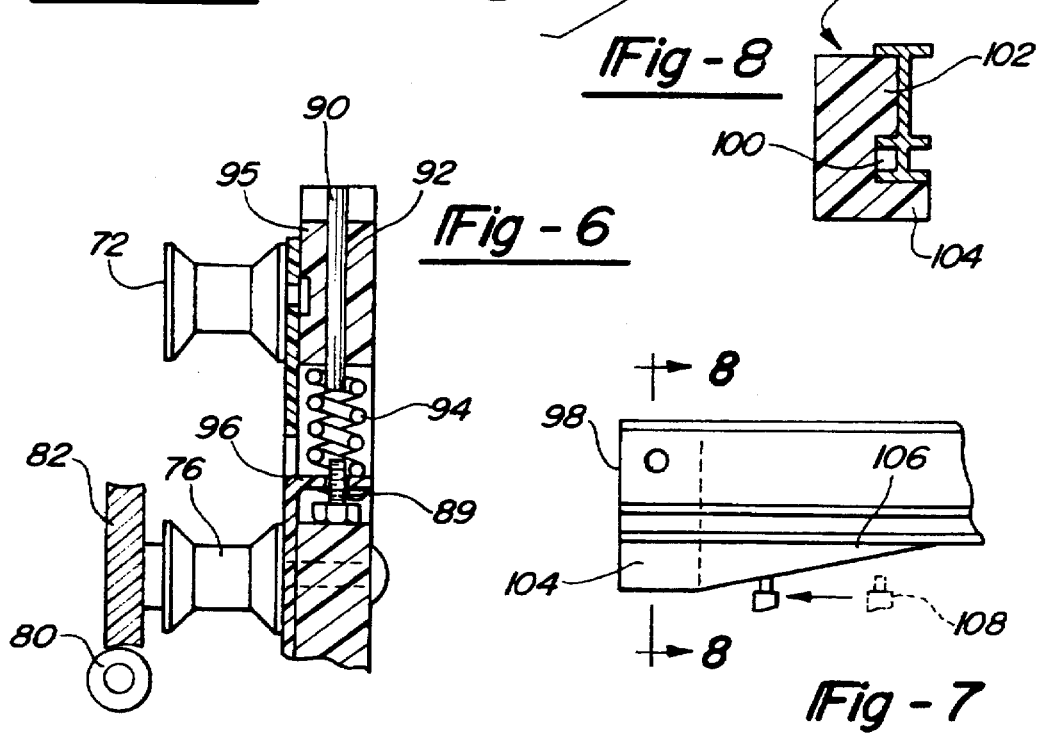

MOTORIZED DRAPERY TRACK ASSEMBLY

BACKGROUND

The present invention relates to a motorized drapery track assembly for retracting and extending a drapery or curtain. The assembly is particularly adapted for use in motor homes for retracting and extending a drapery along the windshield of the vehicle. However, it would also be useful in other applications, such as for example, in hospitals to close the curtains to provide privacy between patients. The present invention would allow the patient to close his curtain without calling hospital staff.

With regard to motor homes, motor homes commonly have a drapery mounted on a track for blocking the view into the cab of the motor home. The drapery typically extends from just behind the driver's seat to just behind the passenger's seat. In some applications, the track on which the drapery extends is continuous and in others, it is in sections. As should be appreciated, the track is not straight and includes at least two curves to direct the drapery from the driver's side along the windshield to the passenger's side, and the curtain must be pulled along the track to open and close it. The problem with manually pulling the drapery is the difficulty in doing it. The cab is small and makes maneuvering inside it difficult. To fully close the drapery, a person has to start at the driver's side and walk along the cab, pulling the drapery past the steering wheel, a motor cover, and over any other objects in the cab.

Attempts have been made to motorize drapery tracks, but they have been very complex, expensive, and prone to breakdown because of their complexity. One system was called "Trackman" and was sold by RecMar of Irvine, Calif. The system employed a track that formed the motor coil, and a trolley moved along its length when the coil was energized. This system was expensive to manufacture, difficult to install, and is not believed to have been successful.

Other examples of attempts to motorize drapery tracks are found in U.S. Pat. Nos. 3,091,286; 3,136,358; 3,861,738; 4,819,708; and 4,926,922. These are each discussed in detail in the Information Disclosure Statement filed with this application. Briefly, the above patents are impractical because of their complexity and expense. Generally, they either employ dual cables and pulley systems which get tangled and are hard to install and maintain, or they employ specially designed tracks that are also hard to install and maintain and are expensive to manufacture.

SUMMARY OF THE INVENTION

The present invention provides an inexpensive and reliable motorized drapery track system that can traverse curved sections of track. This invention is particularly suited for use in recreational vehicles to open and close the drapery within the cab of the vehicle. Additionally, the present invention can be used in other applications which require a drapery to be pushed or pulled along a track and, in particular, a track that has one or more sharp curves.

Briefly, the motorized drapery system of the present invention has a motorized carrier that is connected to the drapery to pull or push the drapery along a track. The carrier has a small motor and at least one guide wheel, preferably two, and a drive wheel. The guide wheels contact one surface of the track and the drive wheel contacts the opposite surface. To prevent derailing, one of the guide wheels is mounted so that it can reciprocate with respect to the carriage or, alternatively, so that the carriage can move with respect to the guide wheel.

The carrier freely travels along the track without being derailed along the sharp curves because the drive wheel automatically reciprocates with respect to the guide wheels. In this way, the guide wheels and the drive wheel remain in constant contact with the track surfaces.

In the preferred embodiment, the drive wheel is spring biased into engagement with the track to provide a clamp-like engagement between the drive wheel and the guide wheels. Additionally, the carriage includes manual means to disengage the drive wheel from the track surface so that the drapery can be manually operated in case of power failures, etc. The manual means acts against the bias of the spring that normally biases the drive wheel into engagement with the track.

The invention also employs a unique track and mounting system that permits easy installation in areas with minimal space, such as in recreational vehicles. The preferred track can be easily bent to conform to the desired area. Preferably, the bending can be done by hand.

DESCRIPTION OF THE DRAWINGS

FIG. 3 is an end view of the track used in the preferred embodiment of the motorized drapery track assembly of the present invention and a partial view of one of the guide wheels.

FIG. 4 is a perspective view of the motorized carriage, a view of the end of the track and a perspective view of the end cap.

FIG. 5 is a view of the carriage with the housing cover removed.

FIG. 6 is a cross-sectional view taken along line 6—6 of FIG. 5.

FIG. 7 is a side view of the rail end with the shut off switch engaging the ramp.

FIG. 8 is a cross-sectional view taken along line 8—8 of FIG. 6.

DETAILED DESCRIPTION OF THE INVENTION

Figure 1:
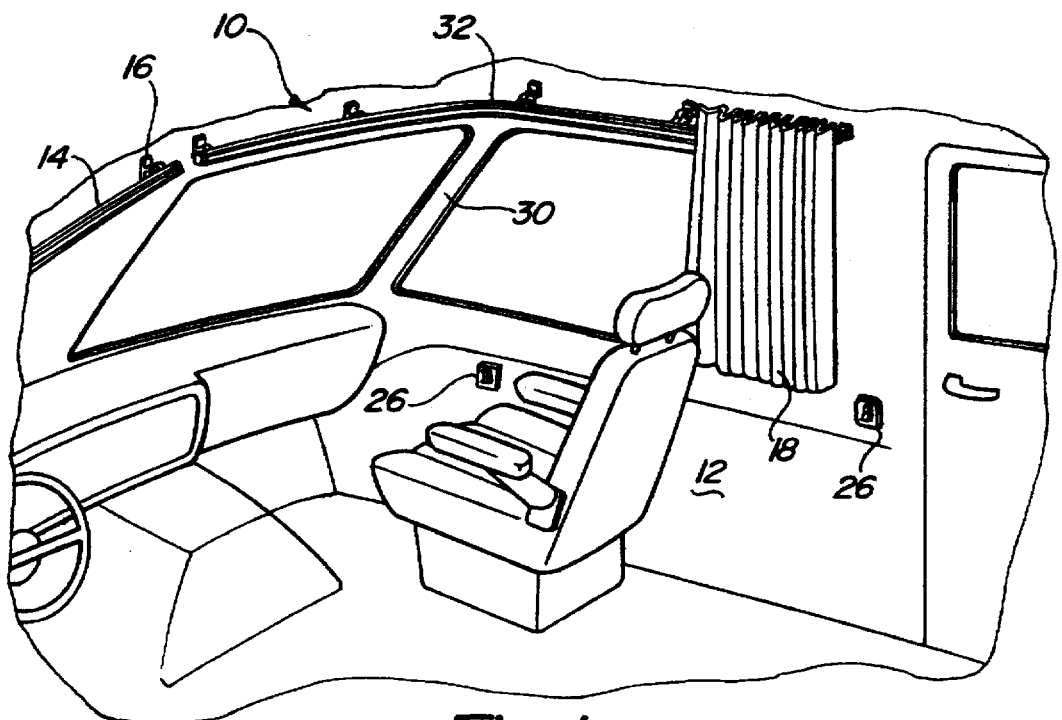
FIG. 1 is a partial perspective view from the inside of the cab of a recreational vehicle having the motorized drapery track assembly of the present invention mounted along the side windows and the windshield.

With reference to FIG. 1, the motorized drapery track assembly of the present invention is shown generally at 10 mounted within the cab 12 of a recreational vehicle. It should be understood by those of ordinary skill in this art that the drapery track assembly can be used in a wide range of applications; its use in a recreational vehicle is by way of example and is not intended to unduly limit the scope of the claimed invention.

Figure 2:
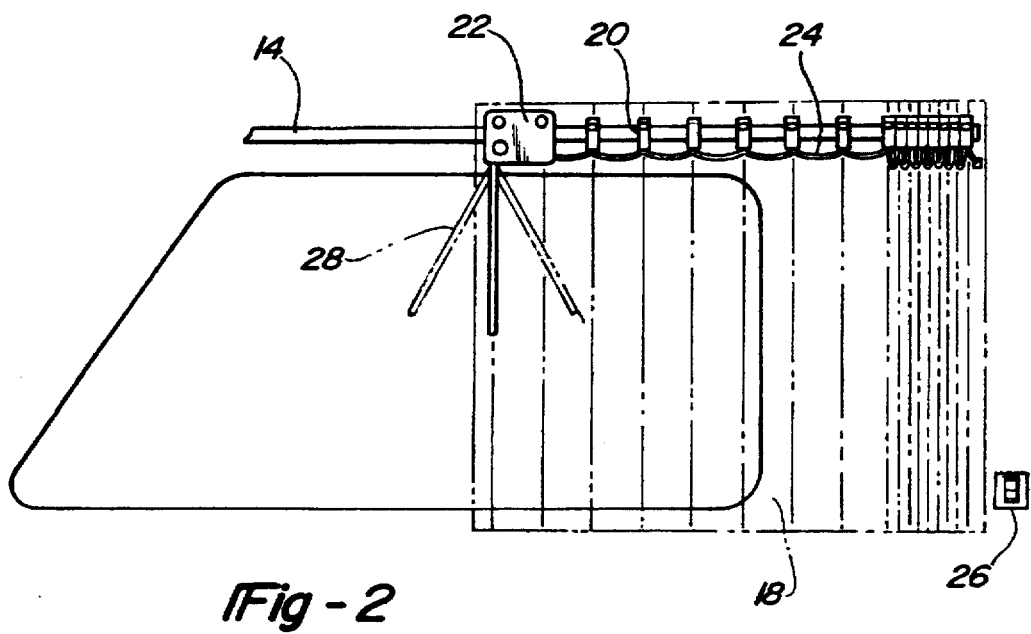
FIG. 2 is a plan view of the motorized drapery track assembly of the present invention.

With reference to FIGS. 1 and 2, the assembly 10 includes a track 14 mounted through brackets 16 to the interior wall of cab 12. A drapery or curtain 18 is hung from track 14 through drapery trolleys 20. Trolleys 20 suspend curtain 18 from track 12 to permit the curtain to be pulled or pushed along the track to open and close drapery 18. In the preferred embodiment, the trolleys have at least one wheel to facilitate low friction movement along track 14. A motorized carriage 22 is connected to at least one of the trolleys 20 and, when energized, pulls or pushes the trolleys 20 and, in turn, drapery 18 along track 14.

As illustrated in FIG. 1, carriage 22 receives electrical power through wires 24 interconnected to the drapery trolleys 20 and controlled through conveniently placed switches 26. It should be understood by those of ordinary skill in the art that other means of supplying power to carriage 22 are within the scope of the present invention. Other means, such as for example a battery operated carriage which is remotely controlled, could be used and would not require wiring 24. In a remote system, battery power would be used to supply power to the motor within carriage 22. If such a device were used, Applicant would provide battery charging means at the fully opened and fully closed positions of drapery 18. These battery charging means would act as docking stations for carriage 22. Additionally, other methods of routing the wiring are within the scope of the present invention. For example, the wiring could be attached to the drapery, instead of being carried by the trolley.

As illustrated in FIG. 1, the drapery assembly is in two sections. This again is by way of example only; a continuous track or one of several sections is within the scope of this invention. In the open position, as illustrated in FIG. 1, the drapery is stored along the sidewalls of the cab next to or immediately behind the driver and passenger sides. When closed, both draperies 18 meet at the center of the windshield, and during their traverse, must make a sharp turn, of up to 90°, adjacent to the pillars 30 of the vehicle. The turn illustrated is approximately 110°. One of the important features of the present invention is its ability to make all necessary turns within an 8-inch radius bend of the track. The radius bend is referring to a curve in the track that forms a segment of a circle, with the circle having an 8-inch radius.

With reference to FIG. 3, the track 14 and mounting bracket 16 will be described in greater detail. Track 14 is an aluminum I-beam track, which is used because of the ease in making smooth bends for custom installations, without sophisticated bending fixtures. Track 14 has a body portion 32 and opposed flanges 34 and 36 to provide added strength to track 14. A support member 38 protrudes from body 32 between flanges 34 and 36 to provide added strength to track 14. Support 38 extends the full length of track 14. As should be appreciated by those of ordinary skill in the art, the aluminum track with support 38 can be bent by hand to provide the necessary curvature to allow drapery 18 to traverse the interior of cab 12. In the preferred embodiment, the track 14 has a width of 0.250 inches and a height of 0.650 inches.

The mounting bracket 16 is specially constructed for use in mounting track 14 in areas having limited mounting space, such as, for example, a recreational vehicle, van conversion, etc. Bracket 16 includes a fixed arm 40 and a relatively moveable arm 42. Fixed arm 40 has a base 44, which can be positioned against the mounting surface shown generally at 46 in FIG. 3. Base 44 is illustrated in FIG. 3 as having opposed legs 48, but it should be understood by those of ordinary skill in the art that one or more legs 48 could be employed for supporting rail 14. A mounting screw 50 extends through base 44 and attaches bracket 16 to mounting surface 46. In the preferred embodiment, an adhesive pad 52 is inserted between base 44 and mounting surface 46 to provide temporary support for bracket 16 until mounting screw 50 can be attached.

The opposite end of fixed arm 40 has a generally C-shaped mounting head 54 for receipt of a complimentary shaped mounting head 56 formed on arm 42. The interior of mounting head 54 is serrated to mate with serrations on the exterior of mounting head 56. These mating serrations 58 allow manual adjustment of arm 42 with respect to arm 40, but retain the desired angular relationship between arms 40 and 42.

A screw pocket 60 is formed on arm 42 opposite mounting head 56. As can be seen in FIG. 3, pocket 60 is angled with respect to arm 42 to allow angular adjustment of the track 14 with respect to mounting surface 46. In the preferred embodiment, track 14 has an aperture 62 for receipt of a screw 64 for attaching track 14 to arm 42. Because of the ability to manually adjust the relative position of arm 42 with respect to arm 40, base 44 can be attached at various locations along mounting surface 46 with track 14 maintaining the same spacial position within the vehicle. With reference to FIG. 3, by way of example, the arm 40 is shown in phantom at a 90° angle to the position shown in solid lines without affecting the position of track 14.

With reference to FIG. 5, the motorized carriage 22 of the present invention is illustrated. The carriage includes a mounting plate 66 and a housing cover 68. First and second guide wheels 70 and 72 are mounted on plate 66. Each of the guide wheels is mounted for rotation upon a pin 74. Pin 74 acts as the axis of rotation for the guide wheels 70 and 72. The pins are generally perpendicular to plate 66 and are aligned longitudinally with respect to one another. A drive wheel 76 is mounted below guide wheels 70 and 72, as viewed in FIG. 5. Drive wheel 76 is interconnected to a motor 78 through a worm 80 and worm gear 82, which is connected to drive wheel 76. When motor 78 is energized, worm 80 rotates, causing worm gear 82 to rotate, resulting in rotation of drive wheel 76. As can be seen, drive wheel 76 is mounted upon a pin 84.

The guide wheels 70 and 72 and the drive wheel 76 are all formed with flanges 86 to assist in maintaining contact with track 14. In the preferred embodiment, drive wheel 76 has a rubber coating between flanges 86 to assist in frictional contact with rail 14 to facilitate the driving of the carriage 22 along track 14. Guide wheels 70 and 72 engage and support carriage 22 on flange 36 of track 14. Drive wheel 76 engages flange 34 and drives carriage 22 along track 14.

With reference to FIG. 4, hooks 83 are provided on the backside of carriage 22 for interconnecting carriage 22 to drapery 18 so that drapery 18 can be pulled and pushed along track 14 by carriage 22.

With reference to FIGS. 5 and 6, it can be seen that guide wheel 72 is mounted to a moveable plate 95. Plate 95 has a slot 85 adjacent drive wheel 76. The axle 84 upon which wheel 76 is rotatably mounted extends from the back of plate 22 through the slot 85. In this way, the plate 95 can move with respect to wheel 76 and is partly held with respect to plate 66 by wheel 76. The top of plate 95 is mounted behind fasteners 87 to hold plate 95 with respect to plate 66 but still allow sliding movement.

With reference FIG. 6, the spring bias of plate 95 will be discussed. Plate 95 includes a tab 96, a pin 90, a second pin 89, and a spring 94. The pins 89 and 90 act as guides for spring 94, which is held in compression. The pin 89 is illustrated having an attaching nut for attaching it to tab 96. It will be appreciated by those of ordinary skill in the art that the pin could be integrally formed on tab 96 or take other equivalent forms. The purpose of the pins 89 and 90 is to act as a guide for spring 94.

The distance between guide wheel 72 and drive wheel 76 is normally slightly less than the height of track 14. To mount carriage 22 on track 14, the wheel 72 is moved away from drive wheel 76 compressing spring 94. When wheel 72 is released against flange 36, the spring 94 is still compressed, forcing wheels 72 and 76 against the flanges 34 and 36.

Spring 94 allows the relative distance between guide wheel 72 and drive wheel 76 to change to account for curvature in track 14, as track 14 bends to conform to the contours of the mounting wall 46. As should be appreciated by those of ordinary skill in the art, as carriage 22 travels along track 14 and nears a sharp corner, such as 32 in FIG. 1, the tendency for carriage 22 is to continue upon a linear path; and if the wheels 72 and 76 were fixed with respect to one another, carriage 22 would derail. However, the ability of the guide wheel and drive wheel to move away from one another compensates for the linear travel of carriage 22. To state it another way, the carriage actually pivots about the axis of rotation of wheel 70. This pivoting action changes the contact line between drive wheel 76, and flange 34, which maintains continuous contact between them, preventing derailing of carriage 22. In this way, the carriage smoothly traverses track 14. The wheels 70, 72 and 76 remain in constant contact with the track, and any tendency to derail forces wheels 72 and 76 apart so that carriage 22 can traverse the sharp corner.

With reference to FIGS. 4, 5, 7 and 8, the automatic shut-off mechanism will be discussed. As shown in FIG. 4, an end cap 98 is inserted into the end of track 14. End cap 98 has an interior contour which mates with the side contour of track 14. In the preferred embodiment, end cap 98 is press fit into the end of track 14. It includes a recessed portion 100 for receipt of the support 38 and flange 34. A section 102 is configured to fit snugly between flange 36 and support 38, and base portion 104 fits snugly against flange 34. Extending inwardly toward the track 14 from base portion 104 is a ramp portion 106. As the carriage 22 travels along track 14, it approaches the end 32 of track 14, and a shut-off switch 108 is engaged by ramp 106, breaking the circuit to motor 78 and stopping the driving wheel 76. Motor 78 will remain stopped until switch 26 is pressed to energize motor 78 to return in the opposite direction. In the preferred embodiment, end caps 98 are provided at all terminal points of track 14.

Referring now to FIGS. 2 and 5, the manual override will be discussed. Due to the spring biased mounting of guide wheel 72 with respect to carriage 22, drive wheel 76 can be pulled away from flange 34 and disengaged from track 14 so the carriage 22 can be moved manually. Guide wheels 70 and 72 freely rotate along track 14 and support carriage 22 on track 14. When handle 28 is pulled downwardly, drive wheel 76 is disengaged, and the carriage can be pulled without interference from motor 78. In the event there is power failure, the drapery 18 can still be closed or opened manually.

It will be apparent to those of ordinary skill in the art that the above description of this invention is a preferred embodiment, and variations of this embodiment are possible. Therefore, the invention should only be limited to the following claims.

What is claimed is:

1. A curtain assembly for extending and retracting a curtain along a windshield, said curtain assembly comprising:

a rail extending along said windshield, said rail having a generally I-shaped cross-section defined by a generally longitudinally extending body portion capped by top and bottom laterally extending drive surfaces;

a carriage adapted to be connected to said curtain for extending and retracting said curtain along said windshield, said carriage including a support plate for supporting guide wheels, said guide wheels including at least one drive wheel, and a motor means for driving said drive wheel;

said support plate and at least one of said guide wheels being mounted for relative movement with respect to one another such that said carriage can traverse non-linear portions of said rail portion without binding on said rail;

said rail includes a mounting bracket having a fixed arm and a relatively moveable arm, said fixed arm being adapted to be fixedly mounted to a mounting surface and said relatively moveable arm being adapted to move with respect to said fixed arm, said rail being mounted to said relatively moveable arm, said moveable arm being adjustable with respect to said fixed arm to adjust the angular position of said rail, whereby said rail can be mounted to various wail configurations.

2. The drive assembly of claim 1, wherein said at least one of said guide wheels is reciprocally mounted upon said plate opposite said drive wheel.

3. The drive assembly of claim 2, wherein said at least one of said guide wheels is mounted upon a secondary plate reciprocally mounted within said plate, said secondary plate including biasing means normally biasing said drive wheel and said at least one of said guide wheels against said rail.

4. The drive assembly of claim 1, wherein said drive wheel is normally biased against said rail.

5. The drive assembly of claim 1, wherein said guide wheels form a three-point contact with said rail, with said guide wheels contacting said drive surfaces.

6. The drive assembly of claim 1, wherein said guide wheels form a three-point contact with said rail, said guide wheels contacting said drive surfaces, with at least one of said guide wheels being biased against one of said drive surfaces to maintain said carriage on said rail.

7. The drive assembly of claim 6, wherein said plate is adapted to pivot about one of said guide wheels, whereby said guide and drive wheels maintain constant contact with said rail while said drive assembly traverses said rail.

8. The curtain assembly of claim 1, wherein said motor means is supplied power through a wiring assembly extending between a power source and said motor means, said wiring assembly adapted to mount to said curtain assembly.

9. The curtain assembly of claim 8, further including a curtain, and said wiring assembly is adhered to said curtain.

10. The curtain assembly of claim 8 further including a plurality of trolleys to which said curtain is mounted, said trolleys including one or more wheels for guiding the trolley along said track, said wiring assembly being mounted to said trolleys.

11. An automatic retraction and extension assembly for extending and retracting a curtain along a non-linear expanse; said assembly comprising:

a track having opposed surfaces and at least one curved section along the extent of said track;

a pair of guide wheels and a drive wheel, said guide wheels contacting one of said opposed surfaces and said drive wheel contacting said opposite surface, said guide wheels and said drive wheel defining a three-point contact with said track;

said drive wheel and at least one of said guide wheels being relatively moveable along a line generally transverse to the longitudinal length of said track;

said track includes a mounting bracket having a fixed arm and a relatively moveable arm, said fixed arm being adapted to be fixedly mounted to a mounting surface and said relatively moveable arm being adapted to move with respect to said fixed arm, said track being mounted to said relatively moveable arm, said moveable arm being adjustable with respect to said fixed arm to adjust the angular position of said track, whereby said track can be mounted to various wall configurations.

whereby said guide and drive wheels maintain constant contact with said track while said drive assembly traverses said track.

12. The assembly of claim 11, wherein said drive wheel and said at least one of said guide wheels are biased with respect to one another to draw said drive wheel into engagement with said track.

13. The assembly of claim 12, wherein said drive wheel and said other guide wheel are mounted to a first member, and at least one of said guide wheels is mounted to a second member, said first member pivots with respect to said other guide wheel when said drive wheel and said at least one of said guide wheels move along said transverse line.

14. The assembly of claim 11, further including a drive motor interconnected through a worm gear to said drive wheel.

15. The assembly of claim 11, wherein said guide wheel is mounted upon a first member and said drive wheel is mounted upon a second member, said first member is mounted for movement with respect to said second member with said first and second members being interconnected by a spring to bias said second member and said drive wheel against said second surface.

16. The curtain assembly of claim 11, wherein said motor means is supplied power through a wiring assembly extending between a power source and said motor means, said wiring assembly being adapted to mount to said curtain assembly.

17. The curtain assembly of claim 16, further including a curtain, and said wiring assembly is adhered to said curtain.

18. The curtain assembly of claim 16, further including a curtain and a plurality of trolleys to which said curtain is mounted, said trolleys including one or more wheels for guiding the trolley along said track, said wiring assembly being mounted to said trolleys.

19. A curtain assembly for extending and retracting a curtain along a windshield, said curtain assembly comprising:

a curtain;

a rail extending along said windshield, said rail having a generally I-shaped cross-section defined by a generally longitudinally extending body portion capped by top and bottom laterally extending drive surfaces;

a carriage adapted to be connected to said curtain for extending and retracting said curtain along said windshield, said carriage including a support plate for supporting guide wheels, said guide wheels including at least one drive wheel, and a motor means for driving said drive wheel;

said support plate and at least one of said guide wheels being mounted for relative movement with respect to one another such that said carriage can traverse non-linear portions of said rail portion without binding on said rail;

said motor means as supplied power through a wiring assembly extending between a power source and said motor means, said wiring assembly being mounted to said curtain assembly and said wiring assembly is adhered to said curtain.

20. The curtain assembly of claim 19, further including a plurality of trollies to which said curtain is mounted, said trollies including one or more wheels for guiding the trolley along said track, said wiring assembly being mounted to said trollies.

* * * * *